United States Patent
Kim et al.

(10) Patent No.: US 9,657,223 B2
(45) Date of Patent: May 23, 2017

(54) METHOD OF STABILIZING ALPHA-SIALON PHOSPHOR RAW POWDER, ALPHA-SIALON PHOSPHOR COMPOSITION OBTAINED THEREFROM, AND METHOD OF MANUFACTURING ALPHA-SIALON PHOSPHOR

(71) Applicant: KOREA INSTITUTE OF MACHINERY & MATERIALS, Daejeon (KR)

(72) Inventors: Jin Myung Kim, Changwon (KR); Jae Wook Lee, Seoul (KR); Young Jo Park, Changwon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 210 days.

(21) Appl. No.: 14/644,097

(22) Filed: Mar. 10, 2015

(65) Prior Publication Data
US 2015/0184070 A1    Jul. 2, 2015

Related U.S. Application Data

(63) Continuation-in-part of application No. 13/761,110, filed on Feb. 6, 2013, now abandoned.

(30) Foreign Application Priority Data

Jan. 4, 2013   (KR) .................. 10-2013-0000865

(51) Int. Cl.
C09K 11/77 (2006.01)
C09K 11/08 (2006.01)

(52) U.S. Cl.
CPC ...... *C09K 11/7734* (2013.01); *C09K 11/0883* (2013.01)

(58) Field of Classification Search
CPC ........ C09K 11/7706; C09K 7721/7734; C09K 7721/7749
See application file for complete search history.

(56) References Cited

U.S. PATENT DOCUMENTS

2009/0140205 A1* 6/2009 Kijima ................. C04B 35/581
                                                              252/301.6 R

FOREIGN PATENT DOCUMENTS

| JP | 2005-235934 A | 9/2005 |
| JP | 2005-307012 A | 11/2005 |
| JP | 2006-124501 A | 5/2006 |
| JP | 2010-047772 A | 3/2010 |
| JP | 2012-512307 A | 5/2012 |

* cited by examiner

Primary Examiner — Carol M Koslow

(57) ABSTRACT

Disclosed herein is a method of stabilizing alpha-sialon phosphor, including the steps of: mixing raw powder including $Si_3N_4$, AlN, a rare-earth metal oxide and calcium nitride ($Ca_3N_2$) as a calcium source; heat-treating the raw powder to convert the calcium source into Ca—Al—Si—N based compound comprising $CaAlSiN_3$ or $CaAl_2Si_4N_8$; and sintering the heat-treated raw powder thereby forming alpha-sialon phosphor. This method is advantageous in that a reliable alpha-sialon phosphor having high photoluminescence intensity can be manufactured regardless of weather, season, environment and the like.

4 Claims, 9 Drawing Sheets

12
METHOD OF STABILIZING ALPHA-SIALON PHOSPHOR RAW POWDER, ALPHA-SIALON PHOSPHOR COMPOSITION OBTAINED THEREFROM, AND METHOD OF MANUFACTURING ALPHA-SIALON PHOSPHOR

BACKGROUND OF THE INVENTION

1. Technical Field

The present invention relates to a method of manufacturing an alpha-sialon phosphor and, more particularly, to a method of stabilizing alpha-sialon phosphor raw powder that prevents the deterioration of photoluminescence intensity according to humidity or the like in the raw powder treatment process.

2. Description of the Related Art

There are various methods of emitting white light from an LED system. For this purpose, typically, an LED system includes a blue LED chip and a yellow phosphor excited by the chip. Various types of LED systems have been developed since a YAG-Ce based yellow phosphor excited by a blue LED chip made of a GaN thin film was developed.

Such a yellow phosphor is a material indispensable for emitting white light because it is a material for converting near-ultraviolet light or blue light emitted from an LED chip into visible light observed with the naked eye. Currently, high-grade sensitive illuminators that can control color rendering properties and color temperature are being intensively developed by increasing the illumination efficiency of an illuminator and appropriately mixing green, yellow and red phosphors, for the purpose of the advance of white LEDs into general illumination markets. Currently, among these phosphors, an oxynitride-based phosphor, which is formed by replacing all or part of oxygen atoms of an industrially-used oxide-based phosphor with nitrogen atoms, is being intensively researched all over the world, because it exhibits excellent excitation/luminescence characteristics and high stability to temperature/humidity due to its strong covalent bonds and low electron affinity.

Meanwhile, a conventional alpha-sialon phosphor is generally synthesized by sintering a $Si_3N_4$—CaO—AlN—$Eu_2O_3$ based raw powder mixture at high temperature. However, this method is problematic in that a large amount of oxide is used, so the content of oxygen becomes high, and thus it is difficult to increase photoluminescence intensity and convert emission peak wavelengths into long wavelengths.

In order to solve the above problem, Japanese Unexamined Patent Application Publication No. 2005-307012 discloses a Ca—Eu-α-sialon, whose Ca solid solution range is wide compared to conventional α-sialon due to the use of nitride as a $Ca^{2+}$ source (stabilization ion) instead of oxide, and which can easily disperse $Eu^{2+}$ having a large ion radius in a solid solution.

PRIOR ART DOCUMENTS

Patent Documents

Japanese Unexamined Patent Application Publication No. 2005-307012
Japanese Unexamined Patent Application Publication No. 2005-235934
Japanese Unexamined Patent Application Publication No. 2006-124501
Japanese Unexamined Patent Application Publication No. 2010-47772
Japanese Unexamined Patent Application Publication No. 2012-512307

SUMMARY OF THE INVENTION

The present inventors found that an alpha-phase stabilizing compound such as $Ca_3N_2$ is very unstable when exposed to air and does not exhibit desired photoluminescence intensity in certain working environments. Based on these findings, the present invention was devised.

Accordingly, an object of the present invention is to provide a pretreatment process for stabilizing calcium nitride ($Ca_3N_2$) contained in raw powder for preparing an alpha-sialon phosphor.

Another object of the present invention is to provide a method of manufacturing an alpha-sialon phosphor whose photoluminescence intensity is not deteriorated due to working environments, and to a composition for manufacturing the alpha-sialon phosphor.

In order to accomplish the above objects, an aspect of the present invention provides a method of manufacturing alpha-sialon phosphor, including the steps of: mixing raw powder including $Si_2N_4$, AlN, a rare-earth metal oxide and calcium nitride ($Ca_3N_2$) as a calcium source; heat-treating the raw powder to convert the calcium source into Ca—Al—Si—N based compound comprising $CaAlSiN_3$ or $CaAl_2Si_4N_8$; and sintering the heat-treated raw powder thereby forming alpha-sialon phosphor.

In the method, the step of converting the calcium source into a Ca—Al—Si—N based compound may be performed at a temperature of 1000° C. or more under a nitrogen atmosphere.

Preferably, the step of converting the calcium source into the Ca—Al—Si—N based compound may be performed at a temperature of 1000~1250° C., and preferably at 1100~1200° C., under a nitrogen atmosphere.

Further, in the method, a mixing apparatus for performing the step of mixing the alpha-sialon phosphor raw powder and a heat treatment apparatus for the step of converting the calcium source into the Ca—Al—Si—N based compound may communicate with each other under a nitrogen atmosphere.

Another aspect of the present invention provides a method of manufacturing an alpha-sialon phosphor, including the steps of: mixing raw powder including $Si_3N_4$, AlN, a rare-earth metal oxide and $CaAlSiN_3$ or $CaAl_2S_4N_8$ as a calcium source; and sintering the raw powder thereby forming alpha-sialon phosphors.

Still another aspect of the present invention provides an alpha-sialon phosphor composition, including $Si_3N_4$, AlN, a rare-earth metal oxide and a Ca—Al—Si—N based compound and represented by $Ca_xSi_{12-m-n}Al_{m+n}O_nN_{16-n}$:$Re_y$ (here, Re is an activator and is at least one selected from the group consisting of Eu, Ce, Tb, Yb, Sm and Dy, $1.5 \leq m \leq 3.5$, $0.02 \leq y \leq 0.15$, $m=2x+3y$, $0.03 < n < 1.0$).

BRIEF DESCRIPTION OF THE DRAWINGS

The above and other objects, features and advantages of the present invention will be more clearly understood from the following detailed description taken in conjunction with the accompanying drawings, in which:

FIG. 2(a) shows the results of measuring the photoluminescence intensity of the phosphor powder synthesized by sintering the alpha-sialon raw powder exposed to moisture in the temperature-humidity-controlled bath at high temperature in a gas-pressure sintering furnace at an excitation wavelength of 390 nm, while FIG. 2(b) shows photoluminescence intensity at an excitation wavelength of 450 nm;

DESCRIPTION OF THE PREFERRED EMBODIMENTS

Figure 1:
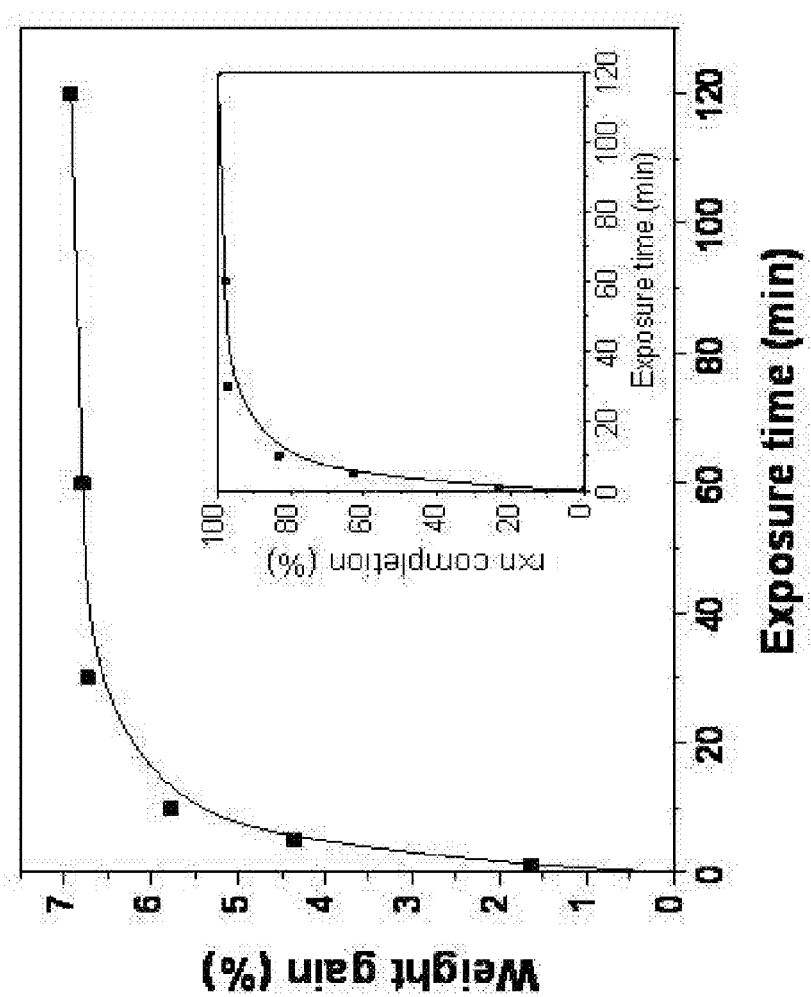
FIG. 1 is a graph showing the weight gain of alpha-sialon raw powder with respect to exposure time when the alpha-sialon raw powder mixed in a glove box was exposed to moisture in a temperature-humidity-controlled bath having a temperature of 25° C. and a relative humidity of 90% according to Example of the present invention.

Hereinafter, preferred embodiment of the present invention will be described in detail with reference to the attached drawings.

The Composition Formula of a stabilized alpha-sialon (α-sialon) phosphor is represented by the following Formula 1:

$$M_xSi_{12-m-n}Al_{m+n}O_nN_{16-n}:Re_y$$ <Formula 1>

(here, Re is an activator and is at least one selected from the group consisting of Eu, Ce, Tb, Yb, Sm and Dy, $1.5 \leq m \leq 3.5$, $0.02 \leq y \leq 0.15$, $m=2x+3y$, $0.03<n<1.0$).

Here, the added Li, Mg, Ca and/or Y act as an alpha-phase stabilizer.

Therefore, the Composition Formula of the Ca-stabilized alpha-sialon phosphor is represented by the following Formula 2:

$$Ca_xSi_{12-m-n}Al_{m+n}O_nN_{16-n}:Re_y$$ <Formula 2>

Meanwhile, the alpha-sialon phosphor represented by the above Formula 2 may be prepared by using $Si_3N_4$, AlN and $Ca_3N_2$ as starting materials. In a case where a very small amount of surface oxides ($SiO_2$, $Al_2O_3$) are included in the starting material powder ($Si_3N_4$ and AlN), the alpha-sialon phosphor may be represented by the following Formula 3:

$$aSi_3N_4+bSiO_2+cAlN+dAl_2O_3+eCa_3N_2+fEu_2O_3 = gCa_xSi_{12-(m+n)}Al_{(m+n)}O_nN_{16-n}:Eu_y$$ <Formula 3>

For example, Table 1 below shows the combination ratio of the alpha-sialon phosphor represented by Formula 3 in which m=3, y=0.05, and n=0.52. Here, it is assumed that $Si_3N_4$ powder contains 1.25 wt % of $SiO_2$, and AlN powder contains 1.5 wt % of $Al_2O_3$.

TABLE 1

| $Si_3N_4$ (g) | AlN (g) | $Ca_3N_2$ (g) | $Eu_2O_3$ (g) | Eu (at %) |
|---|---|---|---|---|
| 63.96 | 23.32 | 11.30 | 1.41 | 0.17 |

In the process of stabilizing the alpha-sialon phosphor raw powder of the present invention, $Ca_3N_2$ included the raw powder is converted into a Ca—Al—Si—N based compound which is a stabilizing compound. Examples of the Ca—Al—Si—N based compound may include $CaAlSiN_3$, $CaAl_2Si_4N_8$ and the like. For example, the formation reaction of $CaAlSiN_3$ is represented by the following Formula 4:

$$Ca_3N_2+3AlN+Si_3N_4=3CaAlSiN_3.$$ <Formula 4>

Further, the present invention provides a method of synthesizing an alpha-sialon phosphor using $CaAlSiN_3$ as a calcium (Ca) source instead of $Ca_3N_2$. In this case, the synthesis of an alpha-sialon phosphor is represented by the following Formula 5:

$$aSi_3N_4+bSiO_2+cAlN+dAl_2O_3+eCaAlSiN+fEu_2O_3 = gCa_xSi_{12-(m+n)}Al_{(m+n)}O_nN_{16-n}:Eu_y.$$ <Formula 5>

For example, Table 2 below shows the combination ratio of the alpha-sialon phosphor represented by Formula 5 in which m=3, y=0.05, and n=0.52.

TABLE 2

| $Si_3N_4$ (g) | AlN (g) | $CaAlSiN_3$ (g) | $Eu_2O_3$ (g) | Eu (at %) |
|---|---|---|---|---|
| 53.03 | 13.18 | 31.38 | 1.41 | 0.17 |

The present invention provides a method of stabilizing an alpha-sialon phosphor using $Ca_3N_2$ as a calcium (Ca) source. Further, the present invention provides a method of manufacturing an alpha-sialon phosphor using a Ca—Al—Si—N based compound (stabilizing compound) as a calcium (Ca) source. Hereinafter, these methods will be described in more detail with reference to the following Examples.

TEST EXAMPLE

Raw powder was combined in a glove box under a nitrogen atmosphere according to the combination ratio of raw powder shown in Table 1 above. Starting powder was weighed according to Table 1, and was then dry-mixed using a household food mixer provided with a teflon-coated blade.

The raw powder mixed in the glove box was exposed to moisture in a temperature-humidity-controlled bath having a temperature of 25° C. and a relative humidity of 90%, and then the weight change thereof was measured.

FIG. 1 shows the weight gain of raw powder with respect to exposure time when the raw powder mixed in a glove box was exposed to moisture in a temperature-humidity-controlled bath having a temperature of 25° C. and a relative humidity of 90%. In FIG. 1, a large graph shows the weight change rate of raw powder, and a small graph in the large graph shows the reaction degree of raw powder with respect to exposure time when the final change degree of raw powder was set 100 after exposing the raw powder to moisture for 2 hours.

From FIG. 1, it can be seen that raw powder containing $Ca_3N_2$ reacts with external moisture very rapidly. Further, in terms of degree of reaction thereof, it can be seen that 20% or more of the entire reaction thereof was conducted within 1 minute, 60% of the entire reaction thereof was conducted after 5 minutes, 80% or more of the entire reaction thereof was conducted after 10 minutes, and 97% or more of the entire reaction thereof was conducted after 10 minutes, at which point the reaction was nearly completed.

When raw powder was exposed to moisture for 2 hours, the weight gain of the raw powder was about 6.9%, which is greater than the theoretical weight gain (5.64%) thereof when $Ca_3N_2$ is completely converted into $Ca(OH)_2$. The reason for this is that moisture is adsorbed on the surface of raw powder under a high-humidity condition.

As mentioned above, a predetermined amount of the raw powder discharged from the temperature-humidity-controlled bath was charged in a BN container in the glove box by its own gravity due to free fall. The charged raw powder was synthesized into a phosphor at high temperature in a gas pressure sintering (GPS) furnace pressurized by nitrogen. The synthesis condition thereof is that the raw powder was heated from room temperature to 900° C. under a vacuum atmosphere, was pressurized to 0.5 MPa by charging nitrogen gas ($N_2$) at 900° C., and then the pressure was maintained at the final synthesis temperature. The final synthesis temperature was 1800° C., and the pressure was maintained for 4 hours at the final synthesis temperature. The synthesized phosphor was formed into phosphor powder by alumina-induced pulverization. Subsequently, the formed phosphor powder was analyzed.

Figure 2:
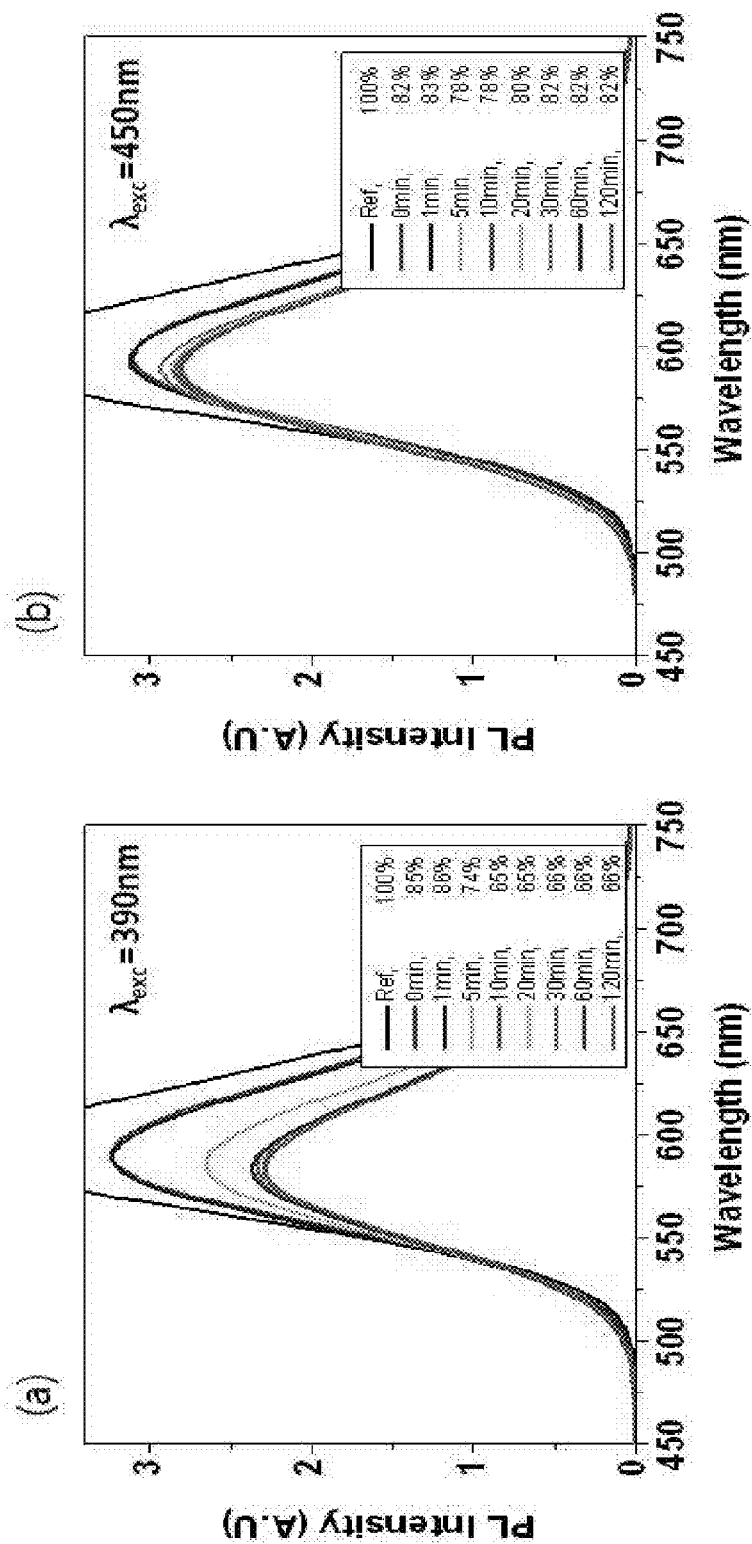

FIG. 2 shows the results of measuring the photoluminescence (PL) intensity of the phosphor powder synthesized by sintering the raw powder exposed to moisture in the temperature-humidity-controlled bath at high temperature in the gas pressure sintering (GPS) furnace. The measurement of the photoluminescence (PL) intensity of the phosphor powder was performed using an excitation 200 W Xe lamp (manufactured by PSI Corporation), and wavelengths of 390 nm and 450 nm were used as excitation wavelengths. In the graphs of FIG. 2, the photoluminescence (PL) intensity thereof was normalized based on a commonly-used alpha-sialon phosphor (manufactured by Denka Co., Ltd.).

From FIG. 2, it can be seen that a difference in the photoluminescence (PL) intensity of the phosphor powder barely occurs when exposure time is less than 1 minute. However, it can be seen that, when exposure time is 5 minutes or more, the PL intensity thereof rapidly decreases at an excitation wavelength of 390 nm, and the PL intensity thereof somewhat decreases even at an excitation wavelength of 450 nm. Further, it can be seen that, when exposure time exceeds 10 minutes, the PL intensity thereof at an excitation wavelength of 390 nm is decreased by about 20% compared to when the phosphor powder was not exposed to moisture, and the PL intensity thereof was continuously maintained thereafter. Further, it can be seen that the PL intensity thereof at an excitation wavelength of 450 nm is somewhat increased with the passage of exposure time, but is decreased compared to the initial PL intensity thereof as shown in the graphs of FIG. 2.

It is known that the PL intensity of an alpha-sialon phosphor decreases when the content of oxygen in the alpha-sialon phosphor increases. Further, it is known that, when the content of oxygen in the alpha-sialon phosphor increases, a dominant wavelength (DWL) is shifted to a short wavelength band, and the shift is caused by the deterioration of an electron cloud effect and covalent properties due to the decrease in the content of nitrogen in the alpha-sialon phosphor. Accordingly, from the results of FIG. 2, it is presumed that, when raw powder containing $Ca_3N_2$ is exposed to moisture, the amount of oxygen in the synthesized phosphor powder increases, thus remarkably deteriorating the luminescence characteristics of the phosphor powder. Therefore, it is required that calcium nitride used as a calcium source for manufacturing an alpha-sialon phosphor must be stabilized.

Figure 3:
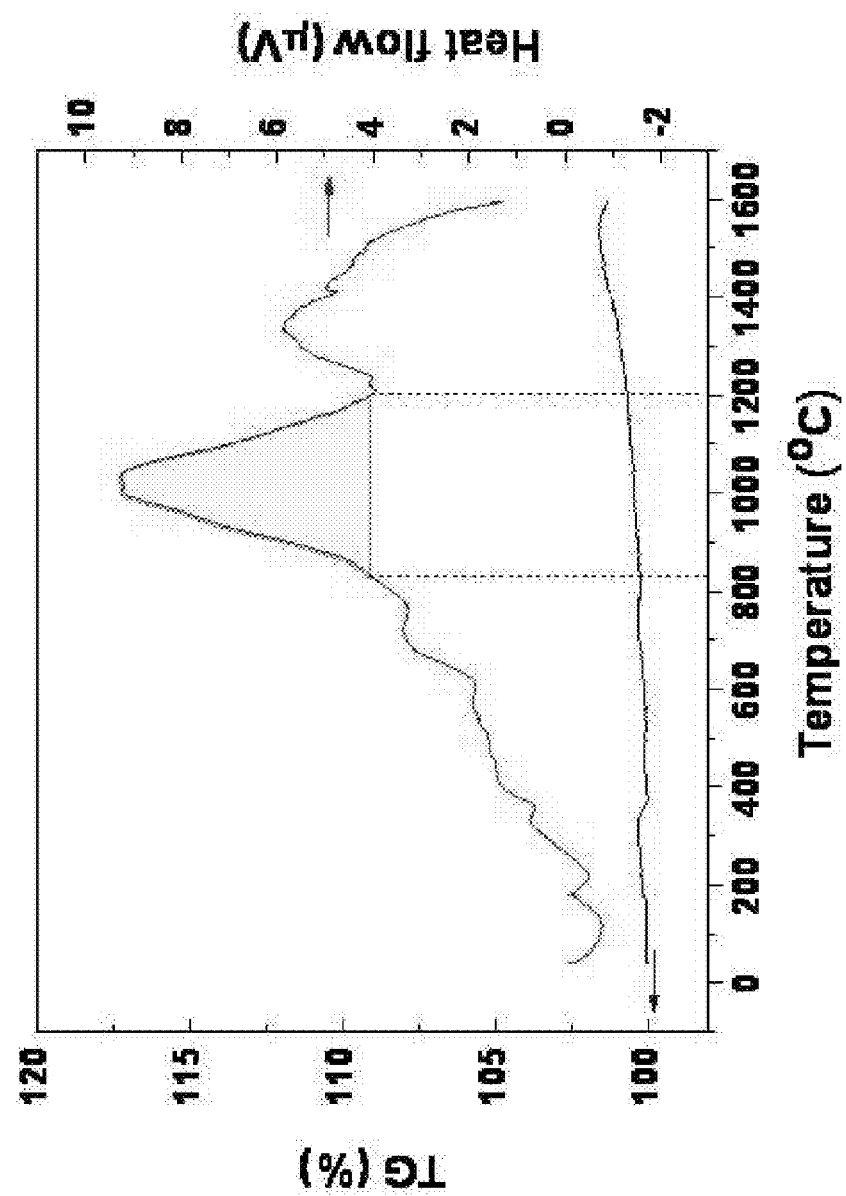
FIG. 3 is a graph showing the results of TG-DTA analysis of alpha-sialon phosphor raw powder.

The TG-DTA analysis of raw powder was conducted according to the combination ratio of Table 1. FIG. 3 is graph showing the results of TG-DTA analysis of raw powder. In this case, the TG-DTA analysis of raw powder was conducted under the condition that raw powder is not exposed to moisture or air. Further, the TG-DTA analysis of raw powder was conducted at a temperature range of 40~1600° C., and was performed under a nitrogen atmosphere.

From the results of the TG-DTA analysis of raw powder, it is presumed that the weight of raw powder was not greatly changed. However, as shown in the heat flow graph of FIG. 3, it can be ascertained that a strong endothermic reaction takes place at a temperature range of 830° C. to 1200° C.

Considering the melting points of various nitrides and oxides added to raw powder ($Si_3N_4$: 1900° C., AlN: 2200° C., $Ca_3N_2$: 1195° C., $Eu_2O_3$: 2350° C.), it is inferred that the endothermic reaction is caused by a chemical reaction rather than by melting. Further, it can be inferred that the lowest point of the endothermic reaction is 1000° C., and the endothermic reaction is finished at 1200° C. Therefore, the heat treatment temperature range suitable for stabilizing $Ca_3N_2$ may be 1000~1250° C., and preferably 1100~1200° C.

EXAMPLE

The raw powder mixed according to the combination ratio of Table 1 above was heat-treated under a nitrogen atmosphere. The heat treatment of the raw powder was performed in a tube furnace connected to a glove box.

The heat treatment of raw powder was carried out under the conditions of 1000° C. 4 hours, 1200° C. 4 hours and 1200° C. 24 hours at a heating rate of 10° C./min. After the heat treatment thereof was finished, the heat-treated raw powder was cooled to room temperature, and was then transferred to the glove box without being exposed to the outside.

Figure 4:
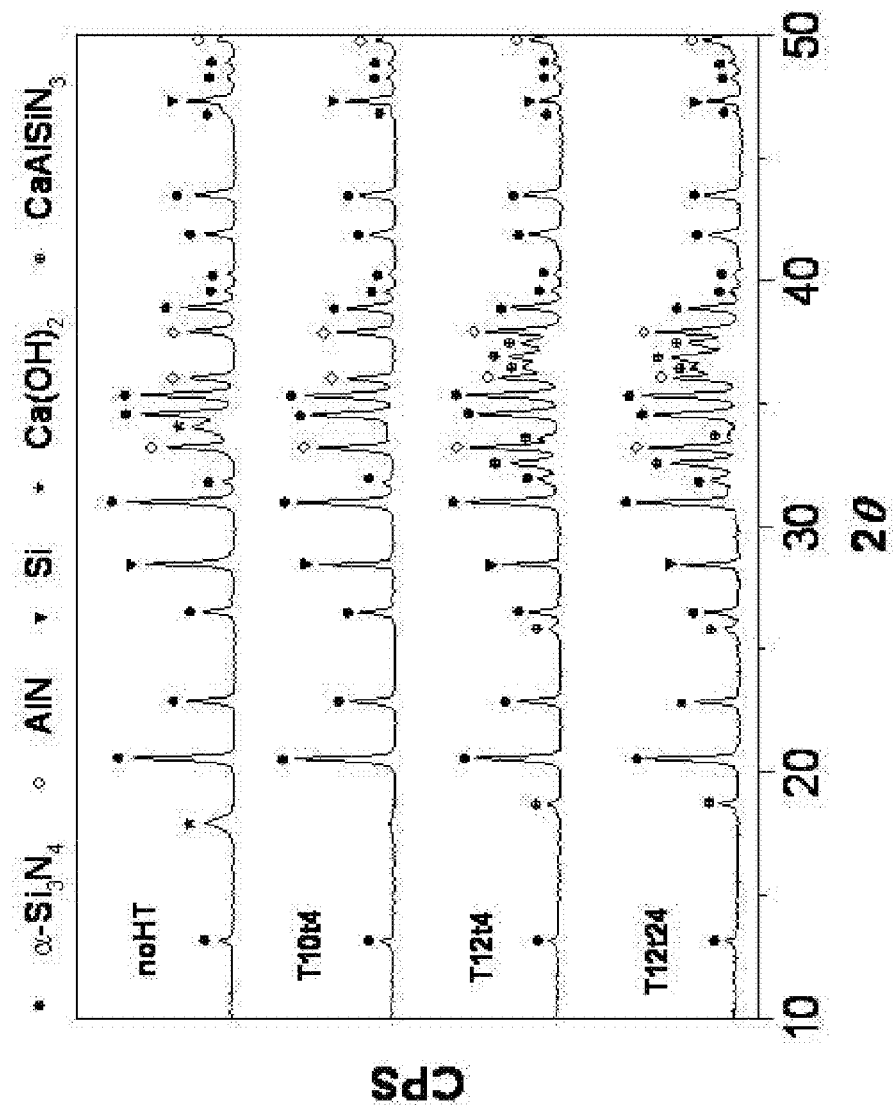
FIG. 4 is a graph showing the results of XRD analysis of alpha-sialon phosphor raw powder having passed through heat treatment.

FIG. 4 is a graph showing the results of XRD analysis of the heat-treated raw powder. In FIG. 4, samples are indicated by T10t4, T12t4 and T12t24, respectively, according to heat treatment temperature and time, and the raw powder, which was not heat-treated, is indicated by noHT.

Referring to FIG. 4, it can be ascertained that, in the case of noHT, which was not heat-treated, a small amount of $Ca(OH)_2$ was detected. It is inferred that this result be caused by the inevitable exposure of noHT to air during the storage or XRD analysis thereof, although noHT was not intentionally exposed to moisture.

Further, it can be ascertained that, in the case of T10t4, neither a $Ca_3N_2$ peak nor a $Ca(OH)_2$ peak was detected, and that, in the case of T12t4 and T12t24, a $CaAlSiN_3$ peak was detected. Here, it is inferred that the $CaAlSiN_3$ peak was shifted at a high angle compared to the peak on the typical JCPDS card.

It is inferred that, in the case of T10t4, the temperature is low enough to cause a $CaAlSiN_3$ reaction, and an amorphous reaction intermediate can be formed in this sample. Further, it is inferred that, in the case of T10t4, alpha-sialon was not synthesized at this temperature, based on the fact that the $Si_3N_4$ peak of this sample is identical to the peak on the typical JCPDS card and a small amount of AlN remains in this sample.

Meanwhile, the results of measuring the PL intensity of T12t4 and T12t24 show that a luminescence peak was detected at an excitation wavelength of 450 to 640 nm. This luminescence peak is identical to the red luminescence spectrum of $CaAlSiN_3$. From this result, it can be ascertained that, in these samples, $CaAlSiN_3$ was produced at relatively low temperature.

Each of the heat-treated samples was synthesized into an alpha-sialon phosphor in a gas pressure sintering (GPS) furnace. At the time of synthesis of the alpha-sialon phosphor, the sample was heated from room temperature to 900° C. under a vacuum atmosphere, was pressurized to 0.5 MPa by charging nitrogen gas ($N_2$) at 900° C., and then the pressure was maintained at the final synthesis temperature. The final synthesis temperature was 1800° C., and the pressure was maintained for 4 hours at the final synthesis temperature. The synthesized alpha-sialon phosphor was formed into alpha-sialon phosphor powder by alumina-induced pulverization. Subsequently, the formed alpha-sialon phosphor powder was analyzed.

Figure 5:
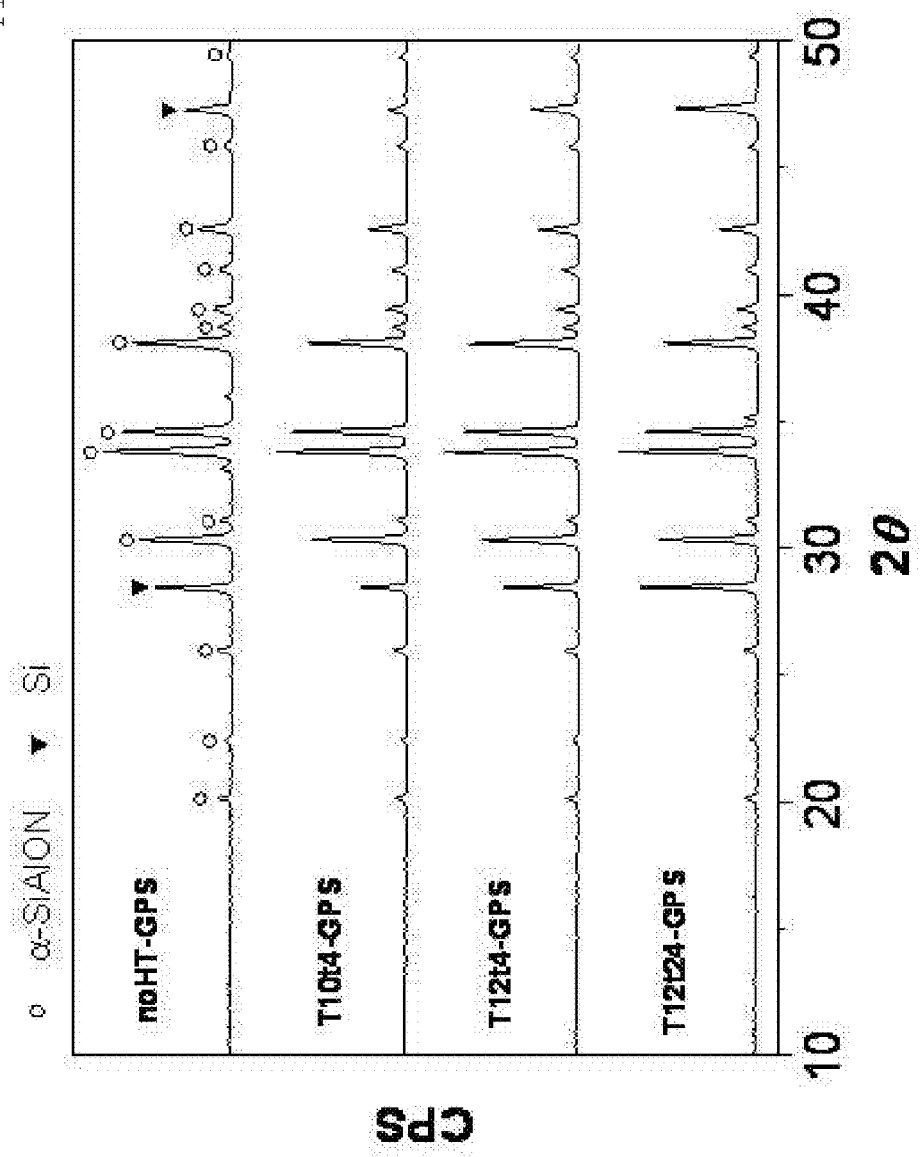
FIG. 5 is a graph showing the results of XRD analysis of alpha-sialon phosphor raw powder having passed through gas-pressure sintering.

FIG. 5 is a graph showing the results of XRD analysis of the gas pressure-sintered samples. In FIG. 5, the sample, which was synthesized into an alpha-sialon phosphor without performing the heat treatment for stabilization, is indicated by noHT.

Referring to FIG. 5, it can be ascertained that all the samples were synthesized into alpha-sialon phosphors. Further, it can be ascertained that, in the heat-treated sample, $CaAlSiN_3$, which is an intermediate product formed during heat treatment, was not detected. The reason for this is that $CaAlSiN_3$ was converted into alpha-sialon during a high temperature synthesis process, and was thus eliminated.

In parts of the samples, a small amount of an unidentified agent was detected. It is inferred that the unidentified agent is a vitric by-product containing Si, Al, O and N. As a result of computing the m value of samples from XRD peak data, it was ascertained that all the samples have an m value of about 2.4, which is lower than the target value (m=3). It can be inferred that the reason for this is that the amount of Ca and Eu in crystal becomes lower than the target value thereof because the surface of raw powder is liquefied during a high-temperature reaction.

Further, from the fact that a final product of the sample having passed through heat treatment for stabilization and a final product of the sample (noHT) not having passed through heat treatment for stabilization show similar phase analysis results to each other, it can be ascertained that a stable alpha-sialon phosphor can be finally produced by the process of stabilizing raw powder using heat treatment.

Hereinafter, the analysis results related to the resistivity of raw powder having passed through heat treatment for stabilization to humidity will be described.

Figure 6:
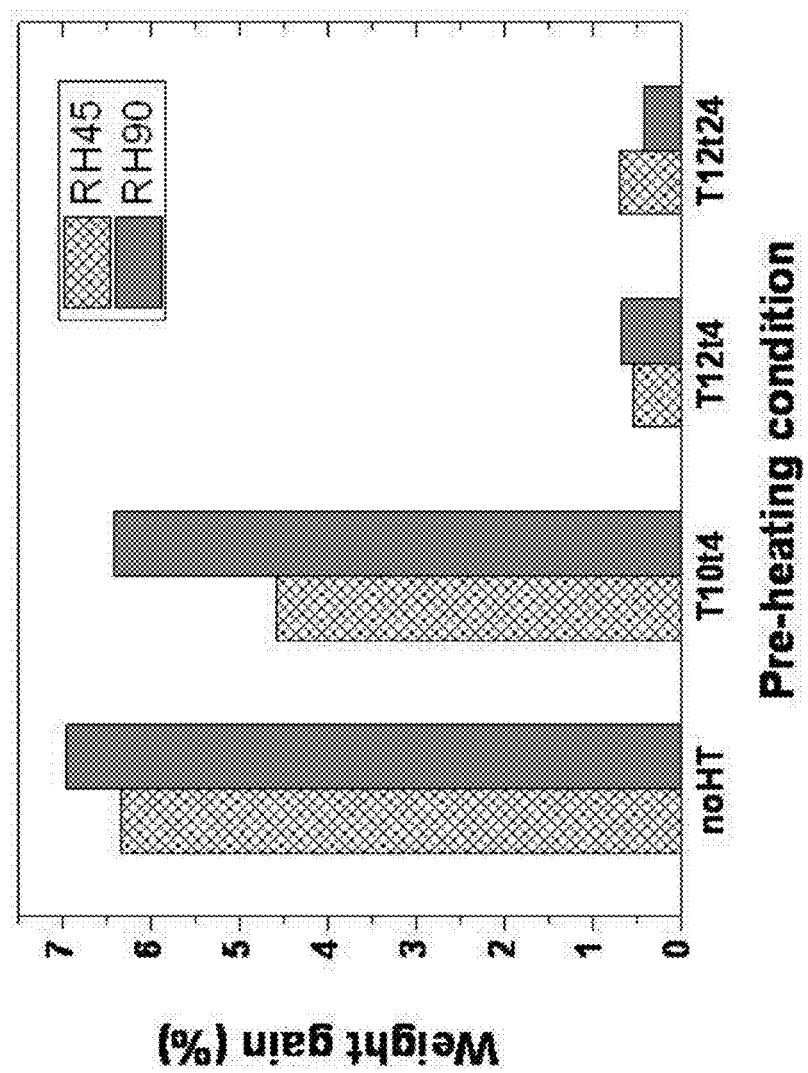
FIG. 6 is a graph showing the results of measuring the weight change of alpha-sialon phosphor raw powder in response to humidity conditions.

FIG. 6 is a graph showing the results of measuring the weight changes of raw powder stabilized by heat treatment and raw powder that has not been heat-treated, in response to various humidity conditions. In the graph in FIG. 6, RH45 means a relative humidity of 45%, and RH90 means a relative humidity of 90%. Here, exposure time was set to 2 hours.

From FIG. 6, it can be seen that the degree of the weight gain of each of the samples (noHT and T10t4) is great, regardless of humidity conditions, and that the weight gain of each of the samples (T12t4 and T12t24) is less than 1%. It is inferred that about 1% of the weight gain of each of the samples (T12t4 and T12t24) is related to moisture adsorption. Consequently, it can be ascertained that $CaAlSiN_3$, produced by stabilizing T12t4 and T12t24 using heat treatment, is a material that has very high resistance to moisture exposure.

However, it was observed that the weight gain of each of the samples (T12t4 and T12t24) was greater under the condition of RH90 than under the condition of RH45. For this reason, it can be inferred that it is difficult to control the quality of an alpha-sialon phosphor in response to humidity change when samples are not stabilized by heat treatment. However, since the reaction of T10t4 with moisture under the condition of RH45 is slow compared to the reaction of noHT with moisture under the condition of RH45, it can be inferred that the heat treatment for stabilization assures resistance to moisture to some degree, although the sample is not completely stabilized by the formation of $CaAlSiN_3$.

Figure 7:
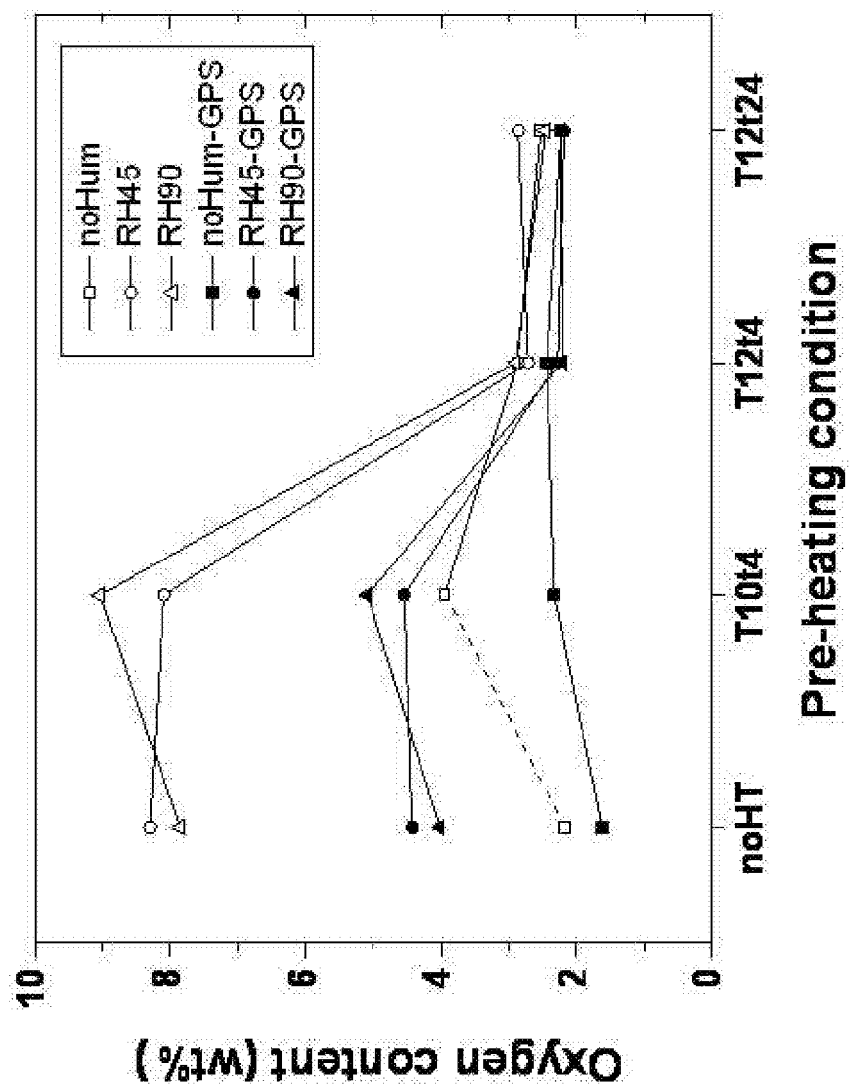
FIG. 7 is a graph showing the results of analysis of the oxygen content of alpha-sialon phosphor powder synthesized by stabilization heat treatment and moisture exposure.

FIG. 7 is a graph showing the results of analysis of the oxygen content of final alpha-sialon phosphor powder synthesized by stabilization heat treatment and moisture exposure. The analysis of the oxygen content thereof was conducted using an oxygen/nitrogen analyzer (TC-436, manufactured by LECO Corporation in U.S.A).

The oxygen contents of alpha-sialon phosphors (noHum-GPS, RH45-GPS, RH90-GPS) synthesized according to the stabilization conditions (noHT, T10t4, T12t4, T12t24) and the moisture exposure conditions (noHum, RH45, RH90) were indicated, and, for comparison, oxygen contents of raw powder before the synthesis of alpha-sialon phosphors according to the moisture exposure conditions (noHum, RH45, RH90) were also indicated. Here, in the case of sample noHum under the condition of noHT, the theoretical oxygen content thereof was indicated, and this theoretical oxygen content was calculated in consideration of the oxygen content of an oxide film formed on the surface of raw powder ($Si_3N_4$ powder and AlN powder).

In the case of samples (noHum, RH45, RH90) that had not passed through an alpha-sialon phosphor synthesis process using GPS, it was observed that, at the time of moisture exposure, the oxygen contents thereof were increased similarly to the weight gains thereof shown in FIG. 6. That is, in the case of noHT and T10t4, the oxygen contents thereof were greatly increased, and in the case of T12t4 and T12t24, the oxygen contents thereof were slightly increased.

Meanwhile, in the case of samples (noHum, RH45, RH90) that had passed through an alpha-sialon phosphor synthesis process using GPS, it was observed that the oxygen contents thereof were greatly decreased. It can be inferred that the reason for this is that $Ca(OH)_2$ is decomposed into CaO and $H_2O$ during heat treatment, and $Si_3N_4$ (average particle size: 0.2 μm) is formed into alpha-sialon of a size of several micrometers, so crystallization and grain growth of alpha-sialon takes place, thereby decreasing the oxygen contents thereof.

Nevertheless, in the case of samples (noHT, T10t4) contaminated by moisture exposure, each of the samples has a high oxygen content of 4~5 wt %, which is two times that of the theoretical oxygen content thereof, even after GPS synthesis. However, in the case of samples (T12t4, T12t24) stabilized by heat treatment, each of the samples has a high oxygen content which is similar to the theoretical oxygen content thereof.

Figure 8:
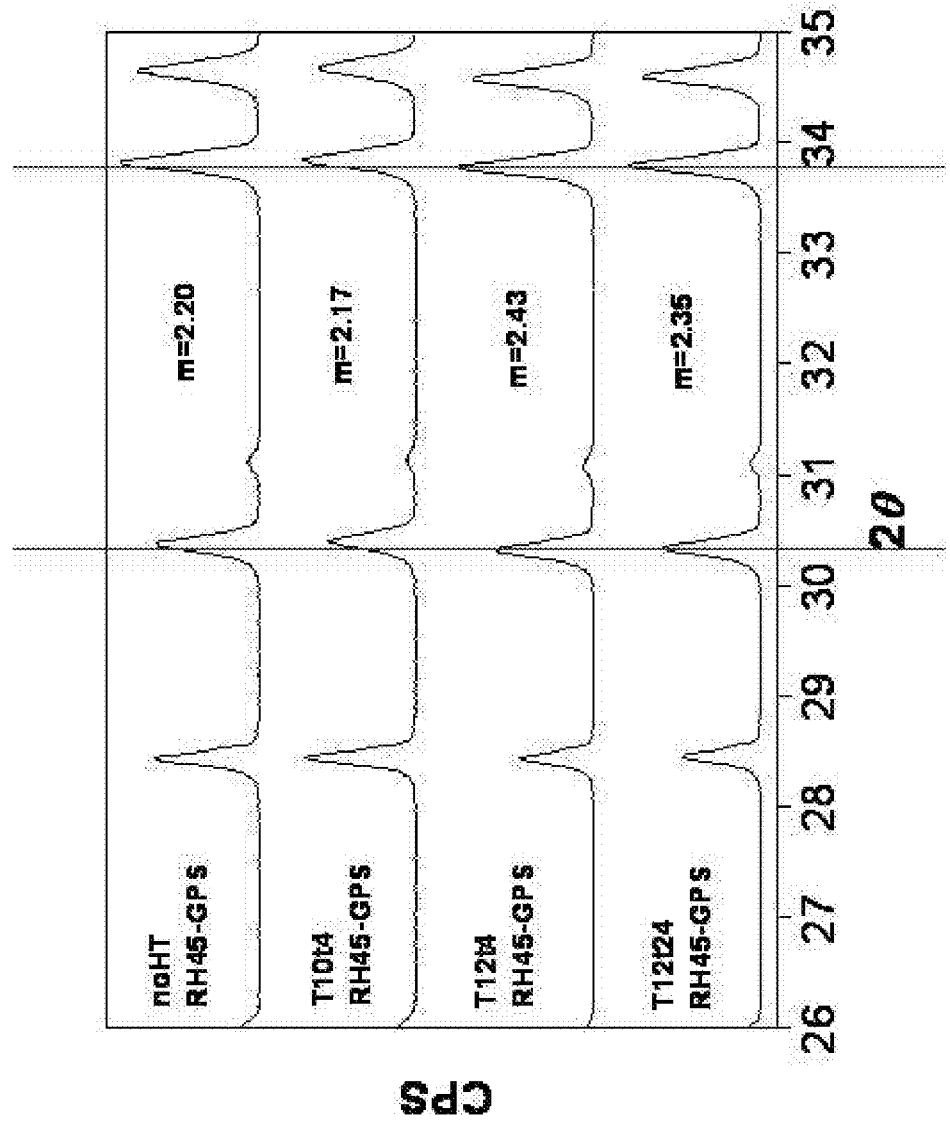
FIG. 8 is a graph showing the results of XRD analysis of alpha-sialon phosphor powder synthesized by gas-pressure sintering.

The XRD analysis of raw powders exposed to moisture under the condition of RH45 was conducted after GPS synthesis. FIG. 8 is a graph showing the results of XRD analysis thereof in the region of 2θ=26~35°.

Referring to FIG. 8, it can be seen that the alpha-sialon peaks of phosphor powders (noHT, T10t4) are shifted to the right, with the result that the m values of these phosphor powders are lower than those of other samples.

In the alpha-sialon phosphor represented by $Ca_xSi_{12-m-n}Al_{m+n}O_nN_{16-n}:Re_y$, wherein $m=2x+3y$, when m decreases, the amount of Ca and Eu solid-dispersed in alpha-sialon decreases. This means that Ca and Eu are not solid-dispersed in the lattice of alpha-sialon, and remain in an amorphous liquid phase. Further, when the content of oxygen in phosphor powder increases, the liquid phase is excessively created, and particles strongly agglomerate, so a large amount of energy is required to perform a pulverizing process. Therefore, when the content of oxygen in phosphor powder increases, an electron cloud effect is deteriorated due to a decrease in the amount of nitrogen, and photoluminescence characteristics are deteriorated due to a reduction of covalent properties. Further, when the content of oxygen in phosphor powder increases, the degree of solid dispersion of Ca and Eu is decreased due to the excessive formation of a liquid phase, and photoluminescence characteristics are deteriorated due to the defects occurring during pulverization.

Figure 9:
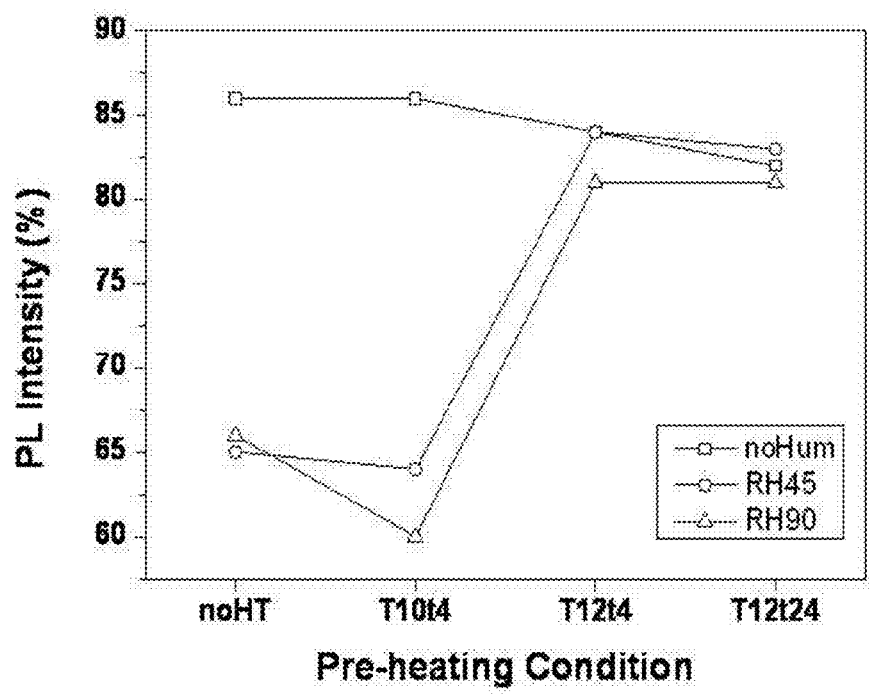
FIG. 9 is a graph showing the results of analysis of photoluminescence characteristics of alpha-sialon phosphor powder synthesized under a stabilization heat treatment condition and a moisture exposure condition.

FIG. 9 is a graph showing the results of analysis of photoluminescence characteristics of alpha-sialon phosphor powder synthesized under a stabilization heat treatment condition and a moisture exposure condition. Here, an excitation wavelength was set at 390 nm.

Referring to FIG. 9, it can be seen that the PL intensity of the sample stabilized by heat treatment at 1200° C. under the moisture exposure condition of noHum is decreased by about 1~3%. However, the PL intensity of each of the samples (noHT and T10t4) under the moisture exposure condition of RH45 and RH90 is decreased by 20% or more, but the PL intensity of each of the samples (T12t4 and T12t24) is similar to that of the sample under the moisture exposure condition of noHum.

As described above, the present invention provides a technology of stabilizing alpha-silalon phosphor raw powder containing a calcium nitride source to have high photoluminescence intensity. According to this technology, a reliable alpha-sialon phosphor having high photoluminescence intensity can be manufactured regardless of weather, season, environment and the like.

Further, the present invention provides an alpha-sialon phosphor raw powder composition containing a Ca—Al—Si—N based compound as a calcium source and a method of manufacturing an alpha-sialon phosphor using the composition. In the present invention, since the Ca—Al—Si—N based compound is solid-dissolved in the lattices of alpha-sialon phosphor raw powder to be consumed, this alpha-sialon phosphor is very suitably used as a monochromatic phosphor for realizing a white LED in combination with a blue light emitting device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a calcium-alpha-sialon phosphor, comprising the steps of:
mixing raw powder including $Si_3N_4$, AlN, a rare-earth metal oxide and calcium nitride ($Ca_3N_2$) as a calcium source;
heat-treating the raw powder to convert the calcium source into Ca—Al—Si—N based compound comprising $CaAlSiN_3$ ; and
sintering the heat-treated raw powder thereby forming a calcium-alpha-sialon phosphor.

2. The method of claim 1, wherein the step of converting the calcium source into a Ca—Al—Si—N based compound is performed at a temperature of 1000° C. or more under a nitrogen atmosphere.

3. The method of claim 2, wherein the step of converting the calcium source into the Ca—Al—Si—N based compound is performed at a temperature of 1000~1250° C. under a nitrogen atmosphere.

4. A method of manufacturing a calcium-alpha-sialon phosphor, comprising the steps of:
mixing raw powder including $Si_3N_4$, AlN, a rare-earth metal oxide and $CaAlSiN_3$ or $CaAl_2Si_4N_8$ as a calcium source; and
sintering the raw powder thereby forming calcium-alpha-sialon phosphors.

* * * * *